United States Patent Office 3,376,219

Patented Apr. 2, 1968

1

3,376,219
REMOVING TASTE AND ODOR COMPOUNDS FROM WATER
Joseph K. G. Silvey, Denton, Tex. 76201
No Drawing. Filed Nov. 9, 1964, Ser. No. 409,955
8 Claims. (Cl. 210—11)

ABSTRACT OF THE DISCLOSURE

Objectionable tastes and odors in water originating with Actinomycetes are removed from the water by adding to it bacteria of the species *Bacillus cereus.*

This invention relates to the removal of objectionable tastes and odors from water. In particular, it relates to the addition of the bacteria *Bacillus cereus* to water exhibiting naturally-occurring objectionable tastes and odors to remove the objectionable taste and odor imparting substances.

The presence of naturally-occurring objectionable tastes and odors in water has long plagued the operators of municipal water supplies, particularly in areas having warm climates such as the South Central United States, and particularly during the warm seasons of the year, although similar odors have been reported in Northeastern United States in January and February. Such objectionable tastes and odors may be marshy, woody, musty, earthy, or moldy, for example, by description but not necessarily by origin. Most of the persistent problems in the area of objectionable tastes and odors are caused by organisms of the family Actinomycetes, which thrive in natural waters in warm climates. Further discussion of the causes of taste and odor problems may be found in my Patent 3,080,315. A rather comprehensive report on the measurement, causes, and occurrence of taste and odor in water, entitled "Taste and Odor in Water—A Critical Review" was published in 1961 by Robert A. Baker, then of The Franklin Institute, Philadelphia, Pa.

The taste and odor imparting compounds which I can eliminate are largely nitrogen compounds exhibiting characteristics of aldehydes, ketones, and aromatic esters originating with the Actinomycetes. This type of ray-fungus grows on and near the shorelines of natural waters and on anything which floats on the surface of the water. The exact molecular structures of the objectionable compounds are not known since they are present in very small amounts and are extremely difficult to extract and separate. Some objectionable tastes and odors are produced from decaying vegetation quite apart from the action of Actinomycetes. These are also nitrogen-containing and can be degraded by my invention. Prior to my invention no truly satisfactory method was known.

The addition of *Bacillus cereus* bacteria to natural water together with an additional carbon source of nutrition, will successfully eliminate objectionable tastes and odors from water. These bacteria are harmless to humans; however, they may be destroyed by chlorination in the usual manner. The following examples will illustrate the manner of operation of my invention.

In the examples and discussion following, the term "threshold odor" means the level of dilution of the sample as determined by a laboratory worker and related to an arbitrary scale, in which the odor is first detectable.

2

This technique is generally known in the art (see the Baker report, supra) but its application differs widely depending, among many other factors, on the individuals used to detect the odors. Throughout this specification the threshold odor values may be considered as relative only with other results herein, since they are highly subjective. However, it may be remarked that, consonant with other reported tests for threshold odors, a value of 1 may be considered odorless, and values over 1 increase exponentially as compared to the sometimes used odor intensity index.

EXAMPLE I

A small lake filtration plant which feeds a water treatment plant was the subject of this test. On 16 separate occasions in a 30-day period, the surface of the lake and/or the lake shoreline was sprayed with a solution containing 10 million *Bacillus cereus* organisms per cc.; a total of 4,100 surface acres of lake were sprayed with an amount of 1% starch-dextrin solution containing $1.0\times10^7$ per ml. *Bacillus cereus,* which is equivalent to .02 p.p.m. of the solution in the lakes. On occasions when the lake surface was sprayed, this was done from a boat in strips about 300 yards apart. Shoreline spraying was performed at the water's edge. Threshold odors prior to the test had ranged from 10 to 16, and within two days after spraying were reduced to 1, which is regarded as odor-free.

The *Bacillus cereus* density in the lake water was 3/ml. prior to the initiation of spraying, reached a density of 300/ml. in one day, and within two additional days, the density had increased to 3000/ml. At this point, the threshold odor averaged only 1. The taste and odor-imparting compounds thus appear to be a supplemental nutrient factor for the *Bacillus cereus. B. cereus* population was increased by only about 7% immediately on addition of the culture, yet apparently this increment plus the favorable nutrient environment introduced was enough to bring about a major alteration in the normal Actinomycetes-*B. cereus* growth cycle.

EXAMPLE II

Several bacterial solutions were made in the following manner. Bacteria of the species *Bacillus cereus* were inoculated and grown on a starch medium which had no added nitrogen, but which included 0.1% glucose and 0.1% yeast extract. Liter samples of natural water were first treated with 0.1 ml. of the starch solution including the bacteria which were present as indicated in Column III of Table I. About 30 minutes contact time was permitted before flocculation. The resulting threshold odor is recorded in Column V of Table I below. Column I records the ATCC number of the variant of *Bacillus cereus.* Column II shows the population density in organism/ml. of *Bacillus cereus* added to the medium. Column III shows the population in the starch medium after 24 hours and at the time of addition to the water. Column IV is the threshold odor (earthy) of the natural water prior to the test. Column V is the threshold odor after treatment. And, Column VI is the percent reduction in threshold odor achieved.

It will be observed from the table that ATCC #10876 provides the best performance and indeed this is my preferred variant. However, it is also true that significant improvement over the controls (*Bacillus firmus* and no organism) was exhibited by all of the ATCC variants of *Bacillus cereus.*

TABLE I.—RESULTS FROM INVESTIGATION OF BACILLUS CEREUS AND BACILLUS FIRMUS

| ATCC No. | Organism/ ml. added to starch | Organism/ml. in starch after hours | T.O. Before | T.O. After | Percent Reduction of T.O. |
|---|---|---|---|---|---|
| I. | II | III | IV | V | VI |
| B. cereus: | | | | | |
| 2 | $1.7 \times 10^3$ | $2 \times 10^6$ | 40 | 9 | 77.5 |
| 246 | 760/ml. | $1.9 \times 10^7$ | 40 | 6 | 85.0 |
| 4,342 | $3 \times 10^3$ | $4 \times 10^6$ | 40 | 10 | 75.0 |
| 6,464 | $6 \times 10^3$ | $2 \times 10^7$ | 40 | 7 | 82.5 |
| 6,465 | $4 \times 10^2$ | $3.2 \times 10^5$ | 40 | 15 | 62.5 |
| 6,472 | 380 | $7.8 \times 10^5$ | 40 | 16 | 60.0 |
| 6,629 | $6 \times 10^3$ | $4.2 \times 10^7$ | 40 | 13 | 67.5 |
| 7,004 | 400 | $4 \times 10^3$ | 40 | 20 | 50.0 |
| 7,039 | $1.5 \times 10^3$ | $7 \times 10^4$ | 40 | 17 | 57.5 |
| 7,064 | 970 | $2 \times 10^5$ | 40 | 13 | 67.5 |
| 7,483 | $7 \times 10^3$ | $1.1 \times 10^8$ | 40 | 4 | 90.0 |
| 9,139 | $2.9 \times 10^3$ | $3.5 \times 10^6$ | 40 | 7 | 82.5 |
| 9,592 | $2.3 \times 10^3$ | $1.6 \times 10^7$ | 40 | 4 | 90.0 |
| 9,620 | $1 \times 10^2$ | $1.8 \times 10^5$ | 40 | 20 | 50.0 |
| 9,634 | 150 | $13 \times 10^4$ | 40 | 20 | 50.0 |
| 9,818 | $1.2 \times 10^3$ | $1.4 \times 10^6$ | 40 | 8 | 80.0 |
| 10,702 | 600 | $4.6 \times 10^6$ | 40 | 8 | 80.0 |
| 10,876 | $3 \times 10^3$ | $3 \times 10^7$ | 40 | 3 | 92.5 |
| 10,987 | $1.2 \times 10^3$ | $1.96 \times 10^7$ | 40 | 4 | 90.0 |
| 6,462 | $2.5 \times 10$ | $17.8 \times 10^6$ | 50 | 14 | 72.0 |
| B. firmus: | | | | | |
| 8,247 | $1.2 \times 10^3$ | $1.15 \times 10^7$ | 50 | 30 | 40.0 |
| Control—No organisms added | | | 50 | 32 | 36.0 |

It will be noted from the above example that the bacteria used were first cultured on a starch medium. I have found that they are effective to the most practical extent when grown on media which contain no deliberately added nitrogen. It is believed that the succeeding generations of Bacillus cereus grown on such relatively nitrogen-free media far more effective in metabolizing the nitrogen-containing taste and odor-causing compounds as well as the other odor-producing components in the water. Although bacteria grown on nitrogen-rich media can metabolize nitrogen-containing taste and odor-imparting compounds, they are not nearly as effective as B. cereus grown on relatively nitrogen-free media.

The bacteria may be grown on starch to which no yeast or glucose has been added, but it has been noted that the population is not increased nearly as much in the absence of yeast. Vigorous colonies are achieved on media containing hydrolyzed starch even without the addition of dextrin. Bacteria added to raw water without a source of carbon such as a carbohydrate will not thrive sufficiently in the water to effectively remove large amounts of taste and odor-causing compounds. Bacteria grown on relatively nitrogen-free starch media performs well in the metabolizing of taste and odor compounds.

B. cereus is not dangerous or undesirable in any way so far as I am aware. It is present, as stated elsewhere, in natural waters and is easily reduced to minimal numbers by ordinary chlorinating techniques.

The starch including the bacteria can be dried for storage since Bacillus cereus is a spore-former. The prepared dried mixture of starch and bacteria may be made into a suspension shortly before addition to a water to be treated, or, on occasion, can be added to the water in dry form. In either case the bacteria becomes viable within a short time and commence metabolizing the taste and odor compounds. It is preferred, if the mixture is to be used in a potable water supply, for the dormant spores to be exposed to favorable growth conditions for a period long enough to ensure their viability prior to treatment with chlorine or other bactericidal agent. The cells should be viable for about twenty minutes prior to chlorination to be assured of at least some metabolization of the taste and odor compounds.

The starch medium, being a known coagulant aid itself, is preferred as the culture medium at least for the spray solution to be added to the water. It is also, as explained above, helpful for best growth of population in raw water to eliminate large quantities of taste and odor compounds.

However, starch is not essential in my invention. Any satisfactory bacteriological culture medium which is substantially nitrogen-free and which can support the growth of Bacillus cereus may be used.

Although in some instances Bacillus cereus appeared to outgrow other organisms on starch media, especially gram-negative bacteria, it is preferred to use sterilized media and pure Bacillus cereus cultures to avoid contaminations with other organisms.

EXAMPLE III

Four preparations containing Bacillus cereus spores were prepared in the following manner:

Preparation #1.—A mixture of a clay (Clay A) and dehydrated nutrient agar culture of Bacillus cereus was mixed with starch compound in the ratio of 1 gram mixture to 99 grams of the starch. Bacilli per gram = $3.6 \times 10^4$.

Preparation #2.—This preparation was the same as Preparation #1 except Clay B was substituted for Clay A. Bacilli per gram = $1.5 \times 10^4$.

Preparation #3.—A mixture of Clay A and dehydrated starch-glucose-yeast extract culture of Bacillus cereus was mixed with the starch compound in the ratio of one gram of the mixture to 99 grams of the starch. Bacilli per gram was $3.8 \times 10^3$.

Preparation #4.—This preparation was the same as Preparation #3 except the source of inoculum for the starch-glucose-yeast extract medium was from the dehydrated nutrient agar culture mentioned in Preparation #1. Bacilli per gram was $2.8 \times 10^4$.

Two grams of the preparations were mixed with 100 ml. of water and allowed to incubate at room temperature for 24 hours. The numbers of bacteria per gram were then estimated by agar plate counts. Two parts per million of each preparation were used to treat 2 liters of water with a threshold odor of 50 earthy, allowing a contact time of 20 minutes before routine flocculation, sedimentation and retention procedures were employed. Appropriate controls using 2 p.p.m. of the uninoculated starch, as well as one using no starch at all, were carried out at the same time. Results are tabulated below.

| Preparation | Bacilli [1] per gram after 24 hours | Initial T.O. | Final T.O. | Reduction, percent |
|---|---|---|---|---|
| 1 | $3.1 \times 10^7$ | 50 | 14 | 72 |
| 2 | $2.3 \times 10^3$ | 50 | 13 | 74 |
| 3 | $1.0 \times 10^6$ | 50 | 7 | 86 |
| 4 | $1.3 \times 10^8$ | 50 | 5 | 90 |
| Starch Control | | 50 | 28 | 44 |
| Floc Control | | 50 | 40 | 20 |

[1] ATCC No. 10876.

My invention is not restricted to the above illustrative examples. It may be otherwise variously embodied within the scope of the following claims.

I claim:
1. Method of preparing a composition for treating raw water comprising inoculating a sterile substantially nitrogen-free starch medium with *Bacillus cereus*, and placing said medium together with said *Bacillus cereus* in an environment favorable to growth of said *Bacillus cereus* for a period sufficient to render said *Bacillus cereus* nitrogen-starved.

2. Method of claim 1 including the step of drying the culture thus formed to achieve complete sporulation of the *Bacillus cereus*.

3. Composition useful for treating objectionable odors in water comprising, in dry form, a carbohydrate nutrient, a small amount of yeast, and spores of *Bacillus cereus* prepared by the method of claim 2.

4. Composition useful in treating raw water comprising a major quantity of a carbohydrate nutrient medium, a small amount of dextrin, a small amount of yeast, and a small amount of *Bacillus cereus* prepared by the method of claim 2.

5. Method of treating natural waters to remove taste and odor-imparting compounds comprising preparing a suspension of the preparation of claim 2, permitting the suspension to stand for a period of time and under conditions conducive to resumption of viability of the *Bacillus cereus* spores, adding the suspension to said natural waters, and permitting the growth of the resulting viable bacteria for at least 20 minutes.

6. Method of claim 5 including the step of destroying substantially all of said organisms by chlorination prior to use of said water.

7. Method of treating raw water to reduce Actinomycetes odors therein comprising (1) adding water to a deposit of *B. cereus* spores in nitrogen-free carbohydrate which contains small amounts of yeast and dextrin, (2) permitting the culture thus generated to grow in a substantially nitrogen-starved state for at least about 24 hours, and (3) distributing the culture in the raw water at a rate calculated to increase immediately the population of *B. cereus* in the raw water by at least about 5%.

8. Method of claim 7 including the step of chlorinating the water at least about 24 hours after addition of the culture.

References Cited
UNITED STATES PATENTS

| | | | |
|---|---|---|---|
| 2,230,130 | 1/1941 | Bucherer | 195—96 X |
| 2,596,971 | 5/1952 | Allen | 195—100 X |
| 3,009,861 | 11/1961 | Alderton et al. | 195—96 |
| 3,124,517 | 3/1964 | Eloy | 195—96 X |

OTHER REFERENCES

Halvorson, H. O.: Rapid and Simultaneous Sporulation, J. Appl. Bact., 20 (3), 1957, pp. 305–314, pp. 305–308 and 311–314 particularly relied on (copy in Group 170), 195–96.

Silvey, J. K. G., et al.: The Role of Aquatic Actinomycetes etc., Jour. W PCF, March 1962, vol. 34, pp. 222–223 (P.O.S.L.).

Morris, R. L., et al.: Chemical Aspects of Actinomycetes, Metabolites etc., Jour. AWWA, October 1963, vol. 55, pp. 1380–1390, pp. 1380, 1384, 1388 and 1389 particularly relied on (copy in Group 171).

MICHAEL E. ROGERS, *Primary Examiner.*